(12) United States Patent
Joe et al.

(10) Patent No.: US 8,061,146 B2
(45) Date of Patent: Nov. 22, 2011

(54) HEAT TRANSFER AUGMENTATION IN A COMPACT HEAT EXCHANGER PEDESTAL ARRAY

(75) Inventors: Christopher R. Joe, Wethersfield, CT (US); Paul M. Lutjen, Kennebunkport, ME (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/756,237

(22) Filed: Apr. 8, 2010

(65) Prior Publication Data

US 2010/0186419 A1    Jul. 29, 2010

Related U.S. Application Data

(62) Division of application No. 10/945,477, filed on Sep. 20, 2004, now Pat. No. 7,775,053.

(51) Int. Cl.
*F02C 7/12* (2006.01)

(52) U.S. Cl. .......................... 60/806; 60/805

(58) Field of Classification Search .................. 60/752, 60/806, 266, 753–760; 415/178, 115; 416/90 R, 416/97 R; 165/109.1
See application file for complete search history.

(56) References Cited

U.S. PATENT DOCUMENTS

| 2,322,341 | A | | 6/1943 | Booth |
| 2,677,394 | A | | 5/1954 | Brinen et al. |
| 4,042,162 | A | * | 8/1977 | Meginnis et al. ............. 228/106 |
| 4,407,632 | A | | 10/1983 | Liang |
| 4,412,558 | A | | 11/1983 | Burke et al. |
| 4,515,523 | A | | 5/1985 | North |
| 5,601,399 | A | | 2/1997 | Okpara |
| 6,349,761 | B1 | | 2/2002 | Liu et al. |
| 6,402,470 | B1 | | 6/2002 | Kvasnak et al. |
| 6,578,627 | B1 | | 6/2003 | Liu et al. |
| 6,602,047 | B1 | | 8/2003 | Barreto |
| 6,808,367 | B1 | | 10/2004 | Liang |
| 6,810,673 | B2 | | 11/2004 | Snyder |
| 6,955,525 | B2 | | 10/2005 | Liang |
| 6,984,102 | B2 | | 1/2006 | Bunker |

OTHER PUBLICATIONS

Australian Search Report dated Mar. 30, 2006.

* cited by examiner

*Primary Examiner* — Ehud Gartenberg
*Assistant Examiner* — Vikansha Dwivedi
(74) *Attorney, Agent, or Firm* — Carlson, Gaskey & Olds

(57) ABSTRACT

A compact heat exchanger pedestal array for augmenting heat transfer in a machine is disclosed. The compact heat exchanger pedestal array includes a wall having first and second surfaces. The first surface faces a heated flow path and the second surface partially forms a flow path for cooling fluid. A plurality of pedestals extend from the second surface of the wall. At least one turbulator strip extends between adjacent pedestals. The turbulator strips and pedestals are operable for mixing the cooling fluid to increase heat transfer from the wall to the cooling fluid.

14 Claims, 8 Drawing Sheets

HEAT TRANSFER AUGMENTATION IN A COMPACT HEAT EXCHANGER PEDESTAL ARRAY

RELATED APPLICATION

This application is a divisional of U.S. patent application Ser. No. 10/945,477, which was filed 20 Sep. 2004 now U.S. Pat. No. 7,775,053.

GOVERNMENT RIGHTS IN THE INVENTION

The invention was made by or under contract with the Air Force of the United States Government under contract number F33615-03-D-2354.

FIELD OF THE DISCLOSURE

The present disclosure generally relates to a compact heat exchanger pedestal array for augmenting heat transfer in hot components, and more particularly, to augmenting heat transfer in hot components of a gas turbine engine.

BACKGROUND

Internal components in gas turbine engines can be exposed to exhaust gas flow temperatures that exceed the melting temperature of the metal alloys used to form the components. These components include the combustor, turbine, and nozzle. Internal cooling circuits for augmenting heat transfer in such components are known. For example, U.S. Pat. No. 6,402,470 issued to Kvasnak et al. on Jun. 11, 2002, discloses a cooling circuit disposed between a first wall portion and a second wall portion of a wall for use in a gas turbine engine, and includes one or more inlet apertures and one or more exit apertures. The inlet apertures provide a cooling airflow path into the cooling circuit and the exit apertures provide a cooling airflow path out of the cooling circuit. The cooling circuit includes a plurality of first pedestals extending between the first wall portion and the second wall portion.

It would be desirable to augment heat transfer from hot components while minimizing the amount of cooling fluid required, and thus, maximize engine performance. An improved compact heat exchanger is contemplated by the present disclosure.

SUMMARY

In accordance with one aspect of the present disclosure, a compact heat exchanger for augmenting heat transfer in a machine with hot components is provided. The compact heat exchanger includes a wall having first and second surfaces. The first surface of the wall generally is exposed to a heated fluid flow path. The second surface of the wall partially forms a flow path for cooling fluid.

A plurality of pedestals extend from the second surface of the wall. At least one turbulator strip extends between adjacently positioned pedestals in the cooling microcircuit. The compact heat exchanger includes at least one inlet for permitting cooling fluid to flow across the pedestals and the turbulator strips. The compact heat exchanger further includes at least one outlet for the cooling fluid to egress therethrough. The turbulator strips and the pedestals disrupt the cooling fluid flow causing turbulent mixing and increasing heat transfer from the wall to the cooling fluid.

In accordance with another aspect of the present disclosure, a component in a gas turbine engine having internal structure for augmenting heat transfer includes a wall having first and second surfaces. The first surface of the wall faces a heated fluid flow path and the second surface partially forms a flow path for cooling fluid. A plurality of pedestals extend from the second surface of the wall and at least one turbulator strip extends between adjacently positioned pedestals. The height of the turbulator strips can be substantially smaller than the height of the pedestals. At least one inlet for permitting cooling fluid to flow across the pedestals and turbulator strips and at least one outlet for the cooling fluid to egress out of the cooling fluid flow path is provided.

In accordance with another aspect of the present disclosure, a method for augmenting heat transfer in a gas turbine engine is provided. The method includes forming a flow path for cooling fluid. The flow path includes a wall having first and second surfaces wherein the first surface faces a hot flow path and the second surface faces a cooling fluid flow path. A plurality of pedestals are formed on the second surface of the wall and at least one turbulator strip is positioned between adjacent pedestals.

In accordance with another aspect of the present disclosure, a compact heat exchanger for cooling hot walls includes a wall having an outer surface exposed to hot fluid and an inner surface exposed to cooling fluid. At least one pedestal extending from the inner surface has a first predefined height. At least one turbulator strip extending from each pedestal at an oblique angle relative to the flow path of the cooling fluid has a second predefined height that is less than the first predefined height of the pedestal.

Other applications of the present invention will become apparent to those skilled in the art when the following description of the best mode contemplated for practicing the invention is read in conjunction with the accompanying drawings.

Figure 1:
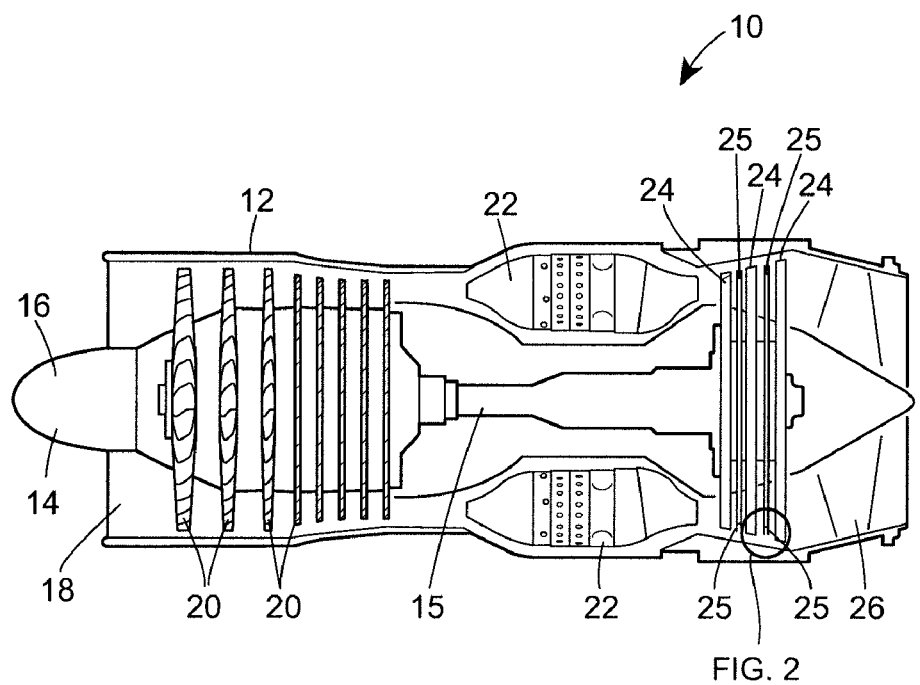
FIG. 1 is a cross-section of a gas turbine engine constructed in accordance with the present disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

The present disclosure provides for a compact heat exchanger pedestal array for augmenting heat transfer in heated components such as those used in gas turbine engines. These components can include, but are not limited to, combustor liners, turbine vanes, turbine blades, blade outer air seals, nozzle components, and other components exposed to hot exhaust gas.

Referring now to FIG. 1, a cross-section of a typical gas turbine engine 10 is shown therein. The gas turbine engine 10 includes an outer case 12 to hold the internal turbo-machinery components and to attach the engine 10 to an aerospace vehicle (not shown). The gas turbine engine 10 includes a rotor 14 that includes a shaft 15 extending from the front of the engine to the rear of the engine. The casing 12 forms an inlet 18 in which air enters past a nosecone 16 and into the engine 10. The rotor can include an axial compressor 20 having at least one compression stage. The compressor 20 is operable for compressing the air and delivering the compressed air to a combustor 22. Fuel mixes with the compressed air and is ignited in the combustor 22. The combustion gas mixture expands at high velocity through a turbine 24. The turbine 24 can also have a plurality of stages. A turbine stator 25 can be positioned between each turbine rotor stage to remove unsteady vortices and unstructured flow patterns to provide a predetermined velocity profile of the gas flow prior to entering the next stage of the turbine 24. A nozzle 26 accelerates the flow exiting the turbine 24 to increase the velocity of the mass flow and generate the thrust required to propel an aerospace vehicle.

Figure 2:
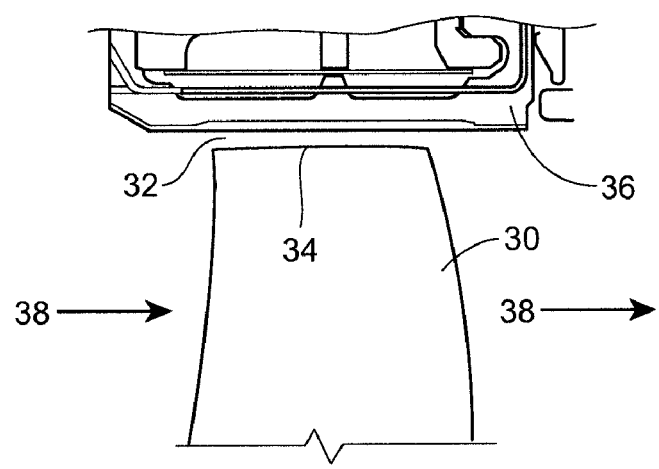
FIG. 2 is an enlarged cross-sectional view partially showing a turbine blade and a blade outer air seal of the engine of FIG. 1.

Referring now to FIG. 2, an enlarged view of a portion of a turbine rotor blade 30 and a blade outer air seal 36 is shown. The turbine rotor blade 30 rotates at relatively high RPM and maintains a minimum clearance area 32 between the turbine blade tip 34 and the blade outer air seal 36. The turbine blade 30 is a rotating component and a blade outer air seal 36 is a static component, however, both of the components are exposed to heated exhaust flow generally moving in the direction depicted by arrows 38.

Figure 3:
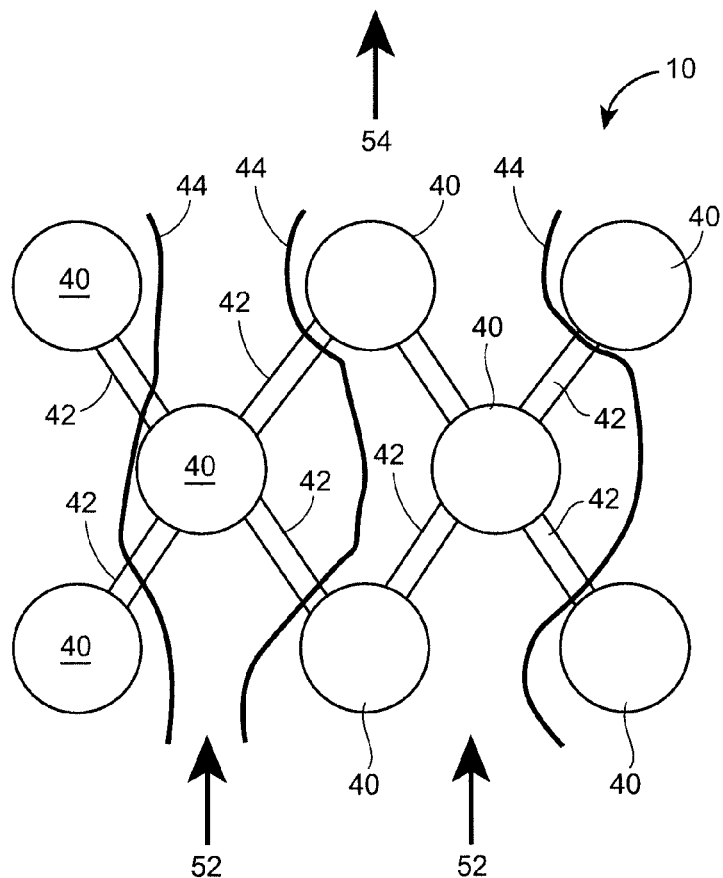
FIG. 3 is a top view of a compact heat exchanger pedestal array also depicting resulting fluid stream lines.
Figure 4:
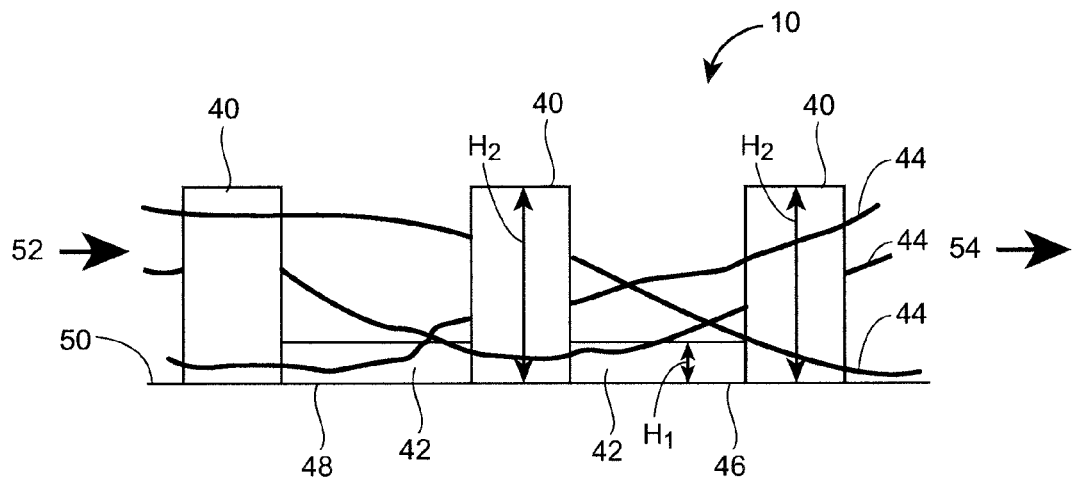
FIG. 4 is a side view of the compact heat exchanger pedestal array of FIG. 3.

Referring now to FIGS. 3 and 4, a compact heat exchanger pedestal array 10 is depicted in a top view and a side view respectively. The compact heat exchanger pedestal array 10 operates to augment heat transfer in components exposed to hot exhaust gases, such as the turbine blade 30 and the blade outer air seal 36 previously described. The compact heat exchanger pedestal array 10 includes a plurality of pedestals 40 spaced intermittently throughout an internal cooling flow path. A plurality of turbulator strips 42 extend from each pedestal 40. The turbulator strips 42 and the pedestals 40 at least partially impede fluid stream lines depicted as curved lines 44 in FIGS. 3 and 4. The partial impediments to the stream lines 44, disrupt the cooling flow and cause turbulent mixing of the cooling fluid. Turbulent mixing increases heat transfer from a wall 46 that has been heated due to exposure to heated exhaust gas flow on a first surface 48. The cooling flow directly contacts a portion of a second surface 50 of the wall 46. This is schematically depicted in FIG. 4, but will be further described in actual hardware below.

The compact heat exchanger pedestal array 10 includes at least one inlet 52, depicted by arrows 52, for permitting cooling fluid to flow across the pedestals 40 and the turbulator strips 42. The compact heat exchanger pedestal array 10 further includes at least one outlet, depicted by arrow 54. The height H1 of the turbulator strips 42 can be substantially less than the height H2 of the pedestals 40. The turbulator strips 42 are also formed at an angle relative to the general flow path of the cooling fluid so that the turbulator strips 42 at least partially directs cooling fluid toward a pedestal 40 located immediately downstream of that turbulator strip 42. The angled configuration of the turbulator strips 42 ensures increased mixing of the cooling fluid relative using pedestals 40 alone. Thus, the turbulator strips 42 increases the heat transfer coefficient between the wall 46 and the cooling fluid.

In one embodiment, each pedestal 40 can be connected to four turbulator strips 42, however, this number can be less or greater depending on the nature of the design and complexity of the internal geometry of the component. The turbulator strips 42 can be positioned directly adjacent the second surface 50 of the wall 46, or alternatively, can include a predefined separation such that a desired amount of cooling fluid can pass between the turbulator strips 42 and the second surface 50 of the wall 46. In a gas turbine engine, the cooling fluid is typically compressed ambient air, however, fluids such as ethylene glycol, propylene glycol, steam, or the like can be used in other applications, such as, for example, an internal combustion engine, steam turbines, and heat exchangers.

Figure 5:
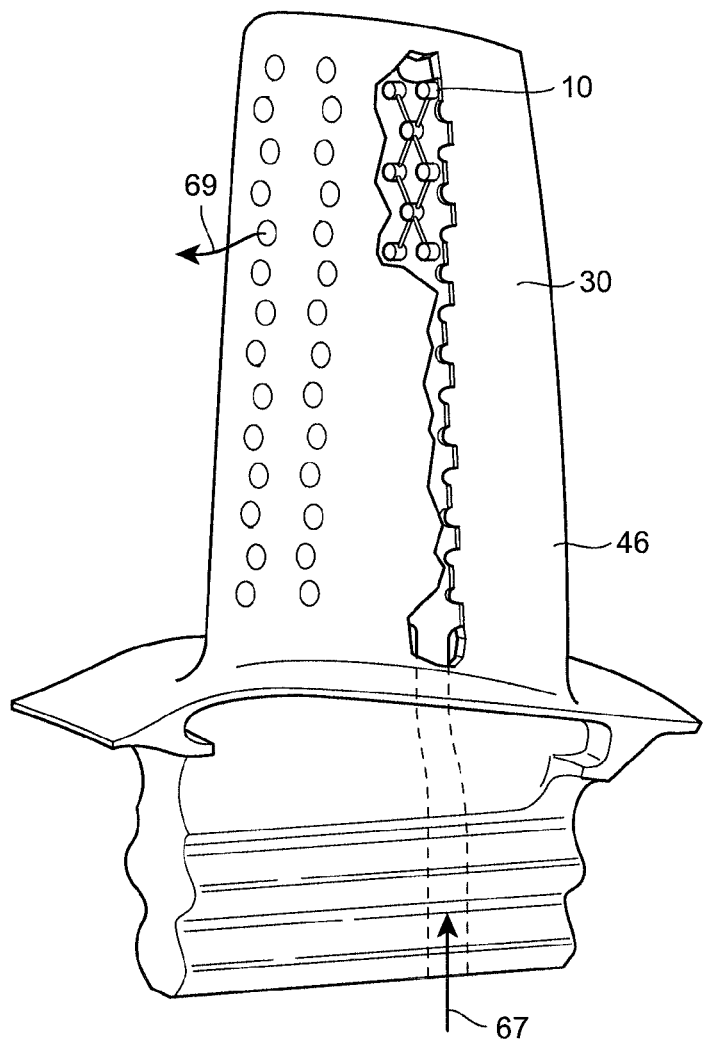
FIG. 5 is a turbine blade with a section of wall cut away to show the microcircuit pedestal array.
Figure 6:
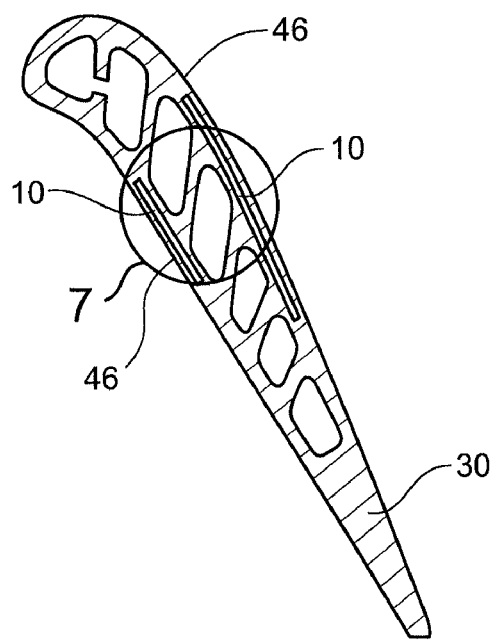
FIG. 6 is a cross-sectional view of the turbine blade of FIG. 5.
Figure 7:
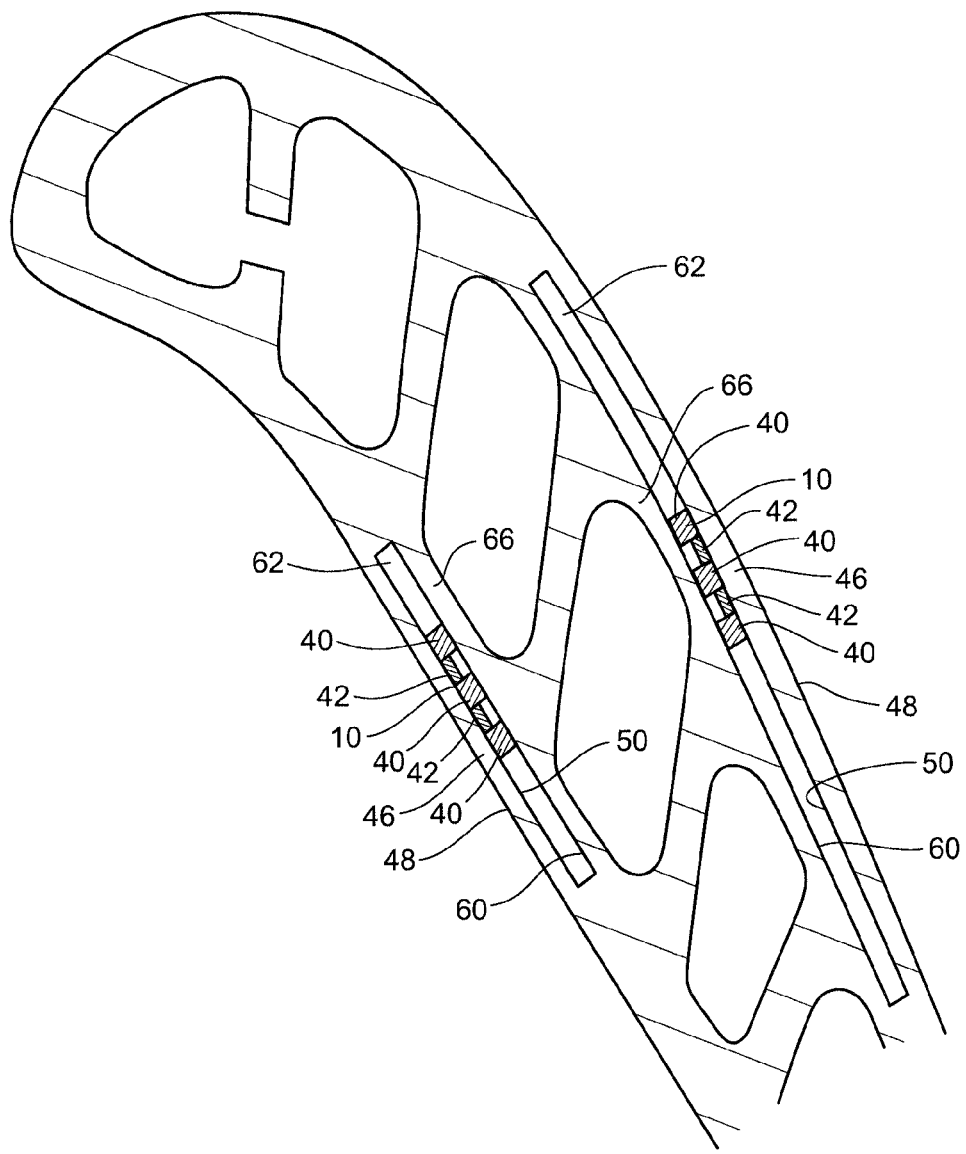
FIG. 7 is an enlarged view of the circled portion in FIG. 6 showing more clearly the microcircuit pedestal array.

The compact heat exchanger pedestal array 10 can be utilized in any number of heated components having geometry with relative thin wall thicknesses and small overall size. The compact heat exchanger pedestal array 10 is most advantageously utilized in components that have very small cooling flow channels. The compact heat exchanger pedestal array 10 can be formed with the turbulator strips 42 having a small height of approximately 0.005-0.010 inches and a width of approximately 0.010-0.020 inches. The pedestals can have a diameter that is approximately 0.015-0.030 inches. The height of the pedestals can be approximately 0.012-0.025 inches. It should be understood that such dimensions are provided by way of example only, and that the dimensional sizes of the pedestals 40 and the turbulator strips 42 can vary depending on the design application Referring now to FIGS. 5, 6, and 7, a turbine blade 30 or portions thereof, are depicted with a compact heat exchanger pedestal array 10 formed therein. The compact heat exchanger pedestal array 10 is disposed adjacent an external wall 46 best seen in FIG. 7. Each pedestal 40 can extend between the internal or second surface 50 of the wall 46 and an opposing internal surface 60. A cooling passageway 62 is defined by the second surface 50 of the outer wall 46 and an opposing surface 60 of an internal wall 66. Referring more particularly to FIG. 5, cooling fluid enters the turbine blade 30 through an inlet depicted by arrow 67. The cooling fluid travels through the pedestal array 10 and exits through an outlet depicted by arrow 69. As is clear, there are cooling passageways on each side of the turbine blade 30. In addition, there are more centrally located larger cooling passages inward of the cooling passageways 62 which incorporate the inventive pedestals.

Figure 8:
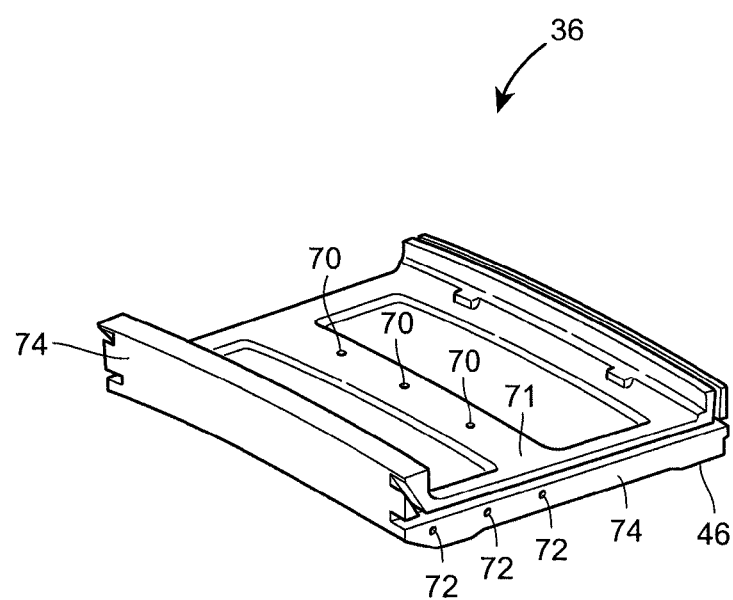
FIG. 8 is a perspective view of a blade outer air seal.

Referring now to FIG. 8, a portion of the blade outer air seal 36 is depicted. Cooling fluid inlet ports 70 can be formed through a surface 71 of the blade outer air seal 36. Cooling fluid outlet ports 72 can be formed in a side wall 74 of the blade outer air seal 36. The lower wall 46 of the blade outer air seal 36 is exposed to high temperature exhaust gas flow. The compact heat exchanger pedestal array 10 is formed in the blade outer air seal 36 to cool the lower wall 46.

Figure 9:
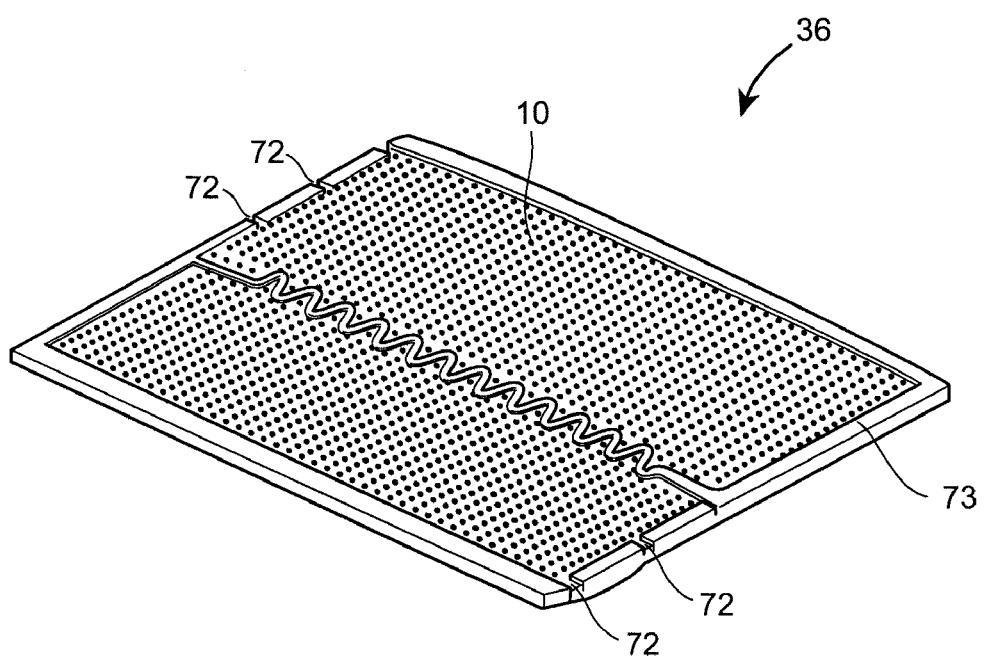
FIG. 9 is a cut-away view of the blade outer air seal of FIG. 8.

A cut-away view of the blade outer air seal 36 is depicted in FIG. 9. A section 73 is illustrated having a microcircuit pedestal array 10 disposed therein. Multiple sections can be formed when heat transfer requirements vary across the component. The outlet ports 72 can be more clearly seen in this view. The outlet ports 72 permit cooling flow to pass out of the microcircuit pedestal array 10. The inlet ports 70 are not shown in this view.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A gas turbine engine comprising:
    a fan section;
    a compressor section;
    a combustion section; and
    a turbine section, at least one component in said turbine section having a first wall having first and second surfaces, the first surface facing a heated fluid flow path and the second surface partially forming a flowpath for cooling fluid, a plurality of pedestals extending from the second surface of the first wall to an opposing surface of a second wall, and at least one turbulator strip extending between adjacent pedestals, a height of the turbulator strips being smaller than a height of the pedestals, each pedestal being connected to at least four turbulator strips, and all four of said turbulator strips being on said second surface of said first wall, there being a spaced second wall of said component.

2. The gas turbine engine of claim 1, further comprising at least one inlet for permitting cooling fluid to flow across the pedestals and turbulator strips.

3. The gas turbine engine of claim 1, further comprising at least one outlet for the cooling fluid to egress out of the cooling flowpath.

4. The gas turbine engine of claim 1, wherein the turbulator strips and pedestals disrupt the cooling fluid flow causing turbulent mixing and increased heat transfer from the wall to the cooling fluid.

5. The gas turbine engine of claim 1, wherein the height of the turbulator strips is less than half the height of the pedestals.

6. The gas turbine engine of claim 1, wherein the height of the turbulator strips is approximately between 0.005 and 0.010 inches.

7. The gas turbine engine of claim 1, wherein the height of the pedestals is approximately between 0.012 and 0.025 inches.

8. The gas turbine engine of claim 1, wherein the turbulator strips are positioned at an angle relative to the direction of cooling fluid flow.

9. The gas turbine engine of claim 1, wherein each turbulator strip at lest partially directs cooling fluid flow toward a pedestal located downstream of the turbulator strip.

10. The gas turbine engine of claim 1, further including two converging turbulator strips connected to an upstream side of each pedestal and two diverging turbulator strips connected to a downstream side of each pedestal.

11. The gas turbine engine of claim 1, wherein the internal structure is formed in a turbine blade.

12. The gas turbine engine of claim 1, wherein the internal structure is formed in a turbine vane.

13. The gas turbine engine of claim 1, wherein the internal structure is formed in an outer air seal for a turbine blade.

14. The gas turbine engine of claim 1, wherein the internal structure is formed in a combustor liner.

* * * * *